(12) United States Patent
Bagala et al.

(10) Patent No.: US 7,250,530 B2
(45) Date of Patent: Jul. 31, 2007

(54) PROCESSES AND SYSTEMS FOR MAKING PHOSGENE

(75) Inventors: Frank M. Bagala, Millbrook, AL (US); Edward L. LaPorte, Montgomery, AL (US); Curtis R. Moorer, Prattville, AL (US); Chunjie Zhang, Montgomery, AL (US)

(73) Assignee: General Electric Company, Schenectady, NY (US)

( * ) Notice: Subject to any disclaimer, the term of this patent is extended or adjusted under 35 U.S.C. 154(b) by 678 days.

(21) Appl. No.: 10/604,549

(22) Filed: Jul. 30, 2003

(65) Prior Publication Data

US 2005/0025693 A1  Feb. 3, 2005

(51) Int. Cl.
*C01B 31/28* (2006.01)
(52) U.S. Cl. ..................................... 562/847
(58) Field of Classification Search ................ 562/847
See application file for complete search history.

(56) References Cited

U.S. PATENT DOCUMENTS 4,039,619 A * 8/1977 Steiner ....................... 423/230
4,556,547 A 12/1985 Nishino et al. ............. 423/230

FOREIGN PATENT DOCUMENTS

| EP | 1112997 A2 | 7/2001 |
| WO | WO 02/08362 A1 | 1/2002 |

OTHER PUBLICATIONS

Chemical Abstracts and Indexes, American Chemical Society, Jul. 2, 1990, XP000063501, ISSN: 0009-2258; "Manufacture of High-Purity Phosgene Gas", Abstract Only, 1 page.
International Search Report, International Application No. PCT/US2004/023429; International Filing date: Jul. 21, 2004; Date of Mailing: Nov. 22, 2004; 6 pages.

* cited by examiner

*Primary Examiner*—Stuart Hendrickson

(57) ABSTRACT

One process for producing phosgene comprises: introducing a carbon monoxide stream to a metal oxide impregnated activated carbon, reducing a hydrogen sulfide concentration in the carbon monoxide stream to produce a cleaned stream, wherein a cleaned stream hydrogen sulfide concentration is less than or equal to about 20 ppm, and reacting carbon monoxide in the cleaned stream with chlorine to produce phosgene.

18 Claims, 2 Drawing Sheets

PROCESSES AND SYSTEMS FOR MAKING PHOSGENE

BACKGROUND OF THE INVENTION

Gases originating from sulfur-containing organic compounds contain hydrogen sulfide, which should be removed prior to the use of the gases for a process such as the production of phosgene. Hydrogen sulfide can be partially removed from a gas by passing the contaminated gas over activated carbon, wherein the hydrogen sulfide is physically adsorbed into the pores of the activated carbon. The sulfur produced is adsorbed on the surface of the activated carbon, and eventually the activated carbon needs to be replaced or regenerated due to sulfur loading on its surface.

Phosgene, $COCl_2$, is produced by the reaction of carbon monoxide gas, CO, and chlorine gas, $Cl_2$, over activated carbon. The carbon monoxide gas used in the reaction is typically produced from coke, and is usually contaminated by a number of sulfur compounds, including carbonyl sulfide (COS), carbon disulfide ($CS_2$), and hydrogen sulfide ($H_2S$). Before the carbon monoxide gas stream enters the phosgene reaction container, activated carbon is used to treat the gas steam and hopefully to remove these sulfur compounds from the gas. The capacity for activated carbon to remove $H_2S$, however, is less than its capacity to remove most other sulfur compounds. As a result of this lower capacity for $H_2S$ removal, $H_2S$ breaks through the activated carbon. That is, $H_2S$ is not removed from the carbon monoxide gas stream entering the phosgene reaction container, at a time when the carbon is not exhausted with respect to its capacity to remove the other sulfur compounds. Several disadvantages occur as a result of the premature exhaustion of the activated carbon with respect to $H_2S$ removal. One problem is that sulfur deposits on the phosgene catalyst in the reaction chamber. Another problem is that deposits of sulfur foul the downstream equipment, such as the $CO/Cl_2$ mixing area, the phosgene reactor, and the phosgene condenser. In addition, there is loss of productivity because of the need to frequently interrupt the synthesis process in order to remove the activated carbon and regenerate or replace it. Therefore, a need exists for a more efficient system to remove sulfur compounds from carbon monoxide gas before it enters a synthesis reaction.

BRIEF DESCRIPTION OF THE INVENTION

Disclosed herein are a system and a process for producing phosgene. In one embodiment the process for producing phosgene comprises: introducing a carbon monoxide stream to a metal oxide impregnated activated carbon, reducing a hydrogen sulfide concentration in the carbon monoxide stream to produce a cleaned stream, wherein a cleaned stream hydrogen sulfide concentration is less than or equal to about 20 ppm, and reacting carbon monoxide in the cleaned stream with chlorine to produce phosgene.

In one embodiment, the system for producing phosgene comprises: a carbon monoxide supply, a metal oxide impregnated activated carbon, and a reactor disposed downstream of and in fluid communication with the metal oxide impregnated activated carbon and with a chlorine supply.

In another embodiment, the system for producing phosgene comprises: a carbon monoxide supply, a first sulfur removal unit comprising an initial activated carbon that has not been impregnated with a metal oxide, a second sulfur removal unit comprising a metal oxide impregnated activated carbon downstream and in fluid communication with the first sulfur removal unit, a moisture removal unit disposed downstream of and in fluid communication with the second sulfur removal unit, and a reactor disposed downstream of and in fluid communication with a chlorine supply unit and the moisture removal unit.

The above described and other features are exemplified by the following figures and detailed description.

BRIEF DESCRIPTION OF THE DRAWINGS

Referring now to the figures, which are exemplary embodiments, and wherein the like elements are numbered alike.

DETAILED DESCRIPTION OF THE INVENTION

Figure 1:
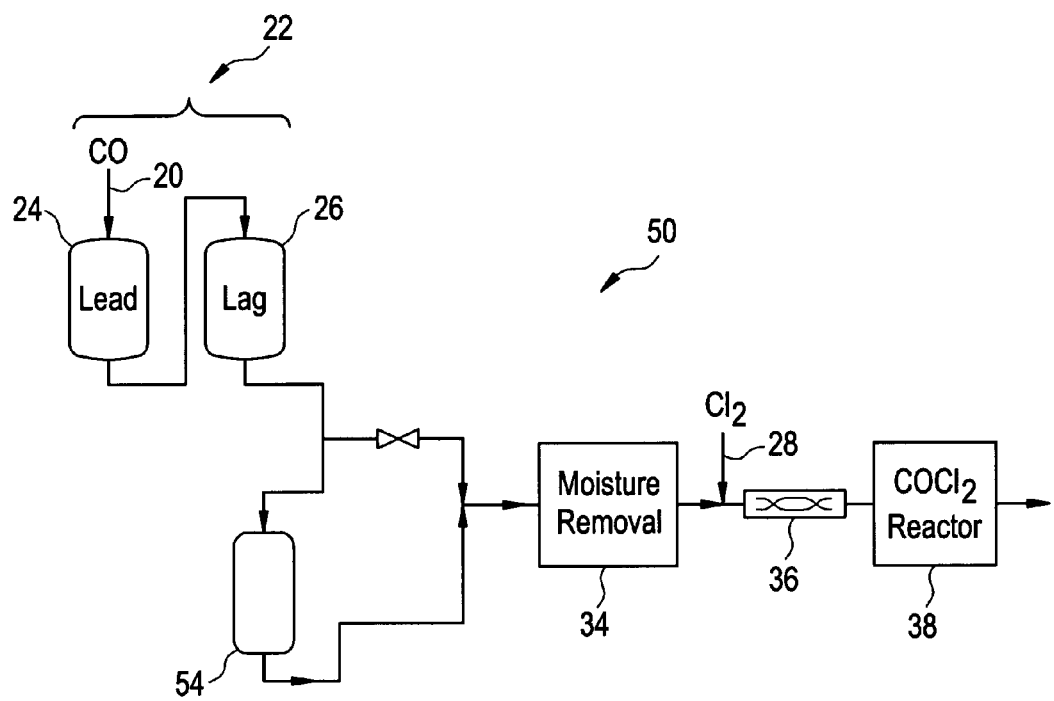
FIG. 1 is a schematic representation of a process for removing hydrogen sulfide gas from a gas stream.

Disclosed herein is a process for removing hydrogen sulfide from a gas stream, and preferably for providing a method for minimizing downstream fouling of equipment such as the phosgene reactor, and for increasing the time period for on-line use of a phosgene synthesis activated carbon catalyst. A carbon monoxide gas stream produced by coke generally comprises about 100 ppm (parts per million) to about 200 ppm $H_2S$; about 4,000 ppm to about 5,000 ppm COS; and about 1,500 ppm to about 2,500 ppm $CS_2$. A first adsorbent composition such as, for example, activated carbon, may be used in one or more upstream adsorbers to remove COS and $CS_2$ from a carbon monoxide gas stream to produce a modified gas stream. Since this catalyst readily becomes saturated with $H_2S$, the modified gas stream then passed to a second adsorber unit downstream of the first unit. In the second adsorber unit $H_2S$ is removed from the carbon monoxide gas stream by metal oxide-impregnated activated carbon to yield a sulfur-free carbon monoxide feed stock for phosgene production (i.e., less than or equal to about 2 ppm of the sulfur compounds).

Although non-metal oxide impregnated activated carbon readily adsorbs (and/or absorbs; hereinafter referred to as removes) many organic vapors, it is a relatively poor adsorbent for polar gases such as $H_2S$. In contrast, the metal oxide impregnated (MOI) activated carbon readily removes $H_2S$ from a gas stream. Optionally, the portion of the system for making the phosgene can comprises only the MOI activated carbon, a combination of the MOI activated carbon and the non-MOI activated carbon (either mixed in a reactor, sequentially in a with the MOI activated carbon preferably disposed downstream from the non-MOI activated carbon), or sequential reactors of the activated carbons with the MOI activated carbon preferably disposed downstream. Additionally, a plurality of reactors of either or both types of the activated carbons can be employed depending upon the size of the reactors and the desired capacity. For economic efficiency, employing non-MOI activated carbon upstream of the MOI activated carbon is preferred.

It is believed that, when a gas comprising hydrogen sulfide is passed over un-impregnated, activated carbon, the hydrogen sulfide is adsorbed onto the surface of the carbon particles. The surface of the activated carbon includes the surface of the pores of the carbon. Eventually the hydrogen sulfide fouls the non-MOI activated carbon to such an extent that the carbon needs to be replaced or regenerated. When activated carbon is modified by a reagent such as a metallic oxide, for example, copper oxide (CuO), the hydrogen sulfide compounds are more effectively removed from the stream. When activated carbons impregnated with a metal oxide are used to remove hydrogen sulfide from gases, there is a synergism between the activated carbon and the metal oxide. The ability of activated carbon to adsorb, react with, and remove the hydrogen sulfide is increased by impregnation of the activated carbon by the metal oxide.

An example of a suitable, commercially available, activated carbon is BPL® activated carbon (Calgon Carbon Corporation, Pittsburgh, Pa.). The BPL® activated carbon may be used unmodified in an adsorber to remove COS and $CS_2$. BPL® activated carbon may also be modified for use in an adsorber to remove hydrogen sulfide by impregnating the activated carbon with metal oxide(s), and optionally with other metal compounds.

The MOI activated carbon can be any MOI activated carbon capable of effectively removing $H_2S$ from a gas stream to concentrations of less than or equal to about 20 ppm $H_2S$, with concentrations of less than or equal to about $10 H_2S$ more preferred, and concentrations of less than or equal to about 2 ppm $H_2S$ even more preferred. In order to attain such efficiencies, the metal oxide in the activated carbon preferably does not block the micropores and macropores of the activated carbon. Such MOI activated carbon is commercially available in various forms including pellets, granular form, and powdered form can be impregnated with metal oxide(s). Activated carbon may be impregnated with copper oxide or other metal oxide(s) by any suitable means, including for example, spray impregnation.

MOI activated carbon can be prepared in various manners. For example, activated carbon is admixed (e.g., impregnated, sprayed, or otherwise contacted) with a first metal compound (e.g., metal oxide(s) or other metal compound(s); in the form of with a solution or suspension of the metal compound(s) in water, aqueous acid, alkali solution, or a variety of solvents or dispersion agents) to form a mixture. The mixture is optionally dried (actively or passively) and/or calcined (e.g., heated to a sufficient temperature and for a sufficient time to activate the metal compounds). Once dried and/or calcined, another metal compound (e.g., compound the same or different from the first metal compound, wherein at least one of the metal compounds is a metal oxide at least after drying and/or calcining) can be admixed into the activated carbon, and again optionally drying (active or passive) and/or calcining the mixture. In other words, the metal oxide or another metal compound can be mixed with the activated carbon initially, simultaneously, or sequentially (before or after drying and/or calcining).

Optionally, the metal compound can be added to a raw material for activated carbon, followed by carbonization and activation. As with the sample processes provided above with relation to forming the impregnated activated carbon, one or more metal compounds can be added to the raw material and/or activated carbon, wherein the metal compounds are the same or different. For example, a metal oxide can be combined with a raw material for forming activated carbon to form a mixture. After carbonization and activation, a second metal compound (the same metal oxide and/or a different metal compound) can be added to the activated mixture, prior to optional drying (active or passive) and/or calcining.

At least one metal compound used to impregnate activated carbon for use in hydrogen sulfide removal from a gas may be a metal oxide(s), or a metal oxide(s) and a metal salt(s). Examples of such metal oxides include copper oxide (CuO), lanthanum oxide ($La_2O_3$), zinc titanate ($ZnTiO_3$), iron oxides (e.g., FeO, iron $Fe_2O_3$, and the like), calcium oxide (CaO), silica (SiO), aluminum oxide ($Al_2O_3$), and the like, as well as combinations comprising at least one of the foregoing metal oxides, with copper oxide and combinations comprising copper oxide preferred for processes operated at about ambient temperature (e.g., about 22° C.).

The MOI activated carbon can comprises sufficient metal oxide to remove $H_2S$ from the gas stream to the desired concentration level. Generally, about 0.5 weight percent (wt %) to about 20 wt % metal oxide is employed, based upon the total weight of the MOI activated carbon. Within this range, less than or equal to about 15 wt % metal oxide is preferred, with less than or equal to about 12 wt % more preferred. Also preferred is a metal oxide concentration of greater than or equal to about 1 wt %. Examples of commercial producers of MOI activated carbons include Res-Kem Corp., Media, Pa. (e.g., CuO Calgon), NUCON International, Inc., Columbus, Ohio (NUSORB FC), Nichem Co., Irvington, N.J., and Cameron Carbon Inc., Baltimore, Md., among others.

In the process of making phosgene, sulfur compounds are removed from the CO stream before the stream contacts the phosgene catalyst to prevent sulfur fouling of the phosgene catalyst, reactor, and/or other components in the process. Sulfur compounds (e.g., COS $CS_2$, and/or the like) are preferably removed with a first reactor (e.g., activated carbon that has not been impregnated with a metal oxide, or the like (non-MOI activated carbon)), and the $H_2S$ is removed by the MOI activated carbon (either before or after the removal of the COS and $CS_2$, with after preferred). Removal of these sulfur compounds comprises contacting the CO stream with the carbon component in a reactor. Various types of reactors can be employed, such as fixed bed, moving bed, packed-bed, stirred tank, fluidized bed, and the like.

Referring to FIG. 1, the first optional sulfur removal unit (22) of the phosgene manufacturing system (50) may comprise a lead position sub-unit (24) and a lag position sub-unit (26), wherein the sub-units may both comprise non-MOI impregnated carbon. The sub-units may be operated in series where the lag position sub-unit (26) is located downstream of the lead position sub-unit (24), or in parallel. During operation, a carbon monoxide stream (20) passes through the first sulfur removal unit (22) where the non-MOI activated carbon removes COS and $CS_2$ from the stream. From the first sulfur removal unit (22), the modified stream passes to a second sulfur removal unit (54), located downstream of the first sulfur removal unit (22), wherein MOI activated carbon therein removes hydrogen sulfide from the stream (for example, at ambient temperature (e.g., about 22° C.) and 80 pounds per square inch gauge (psig) pressure). Depending upon the moisture content of the carbon monoxide stream entering the first sulfur removal unit (22) and the particular metal oxide employed in the MOI activated catalyst, moisture can optionally be added or removed upstream of the second sulfur removal unit (54).

The sulfide-free stream may optionally be further processed for moisture removal prior or subsequent to chlorine (28) introduction to the stream. Therefore, the hydrogen sulfide-free gas stream can pass from the second sulfur removal unit (54) into an optional moisture removal unit (34) that is preferably operated under conditions sufficient to maintain the stream at a moisture level of less than or equal to about 1 ppm. From the moisture removal unit (34), the stream may pass through a mixing device (36) (e.g., an extruder, kneader, valve, or the like) where chlorine added to the stream is mixed therewith prior to the stream entering a reactor (38).

Over time, the sulfur removal unit (54) can become saturated with hydrogen sulfide such that regeneration thereof is desirable. The regeneration can be accomplished, for example, by introducing hot (i.e., at a temperature of greater than or equal to about 350° C. (e.g., by heating the carbon and/or the inert gas)) inert gas (e.g., carbon dioxide, nitrogen, and the like, as well as combinations comprising at least one of these gases) to the unit with a sufficient amount of oxygen to react with the metal sulfide to convert the metal sulfide back to the metal oxide and produce sulfur dioxide. Typically, the oxygen content of the inert gas stream is about 0.2 volume percent (vol %) to about 2 vol % oxygen, based upon the total volume of the inert gas stream. Preferably, the oxygen content of the inert gas stream is about 0.5 vol % to about 1 vol %, with about 0.5 vol % typically employed, based upon the total volume of the inert gas stream.

While not being bound by theory, the mechanism of the adsorption and regeneration reactions may be follows:

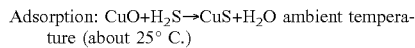

Adsorption: $CuO + H_2S \rightarrow CuS + H_2O$ ambient temperature (about 25° C.)

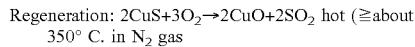

Regeneration: $2CuS + 3O_2 \rightarrow 2CuO + 2SO_2$ hot ($\geq$ about 350° C. in $N_2$ gas The regeneration of the MOI activated carbon catalyst may be performed off-line, e.g., with the removal of the saturated adsorbent, or on-line using a system of valves, and other slight modifications, such that the sulfur containing regeneration stream preferably does not enter the reactor (38).

It is understood that one or several adsorbers, both the non-MOI activated carbon and the MOI activated carbon, can be employed in series, and/or in parallel, depending upon the particular system design. Such design features will be dependent upon desired flow rates, space limitations, individual reactor sizes, on-line or off-line regeneration, and the like. In all systems, at least one MOI activated carbon sulfur removal unit will be employed to inhibit sulfur contamination of the reactor. Optionally, this MOI activated carbon sulfur removal unit can be disposed within the non-MOI activated carbon sulfur removal unit, e.g., between the lead and lag units, preferably downstream of at least a portion of the non-MOI activated carbon.

EXAMPLES

Example 1

Removal of Sulfur Compounds Using BPL® Activated Carbon only

Referring to FIG. 1, a carbon monoxide gas stream comprising 4,630 ppm COS, 1,991 ppm $CS_2$, and 118 ppm $H_2S$, passed through the first sulfur removal unit (22); passing through both the lead position sub-unit (24) and then through the lag position sub-unit (26) at a rate of at 8,000 pounds per hour (lbs/hr). Both lead and lag sub-units included 30,000 lbs of non-MOI activated carbon composition as the sulfur removal composition, which removed COS and $CS_2$ gases and some hydrogen sulfide gas from the carbon monoxide gas stream. After flowing through the lead and lag positions, the modified stream passed through the moisture removal unit (34) that reduced the water content of the modified stream to 1 ppm before passing mixing with chlorine in the mixer (36) and introduction to the reactor (38) where phosgene was produced.

Figure 2:
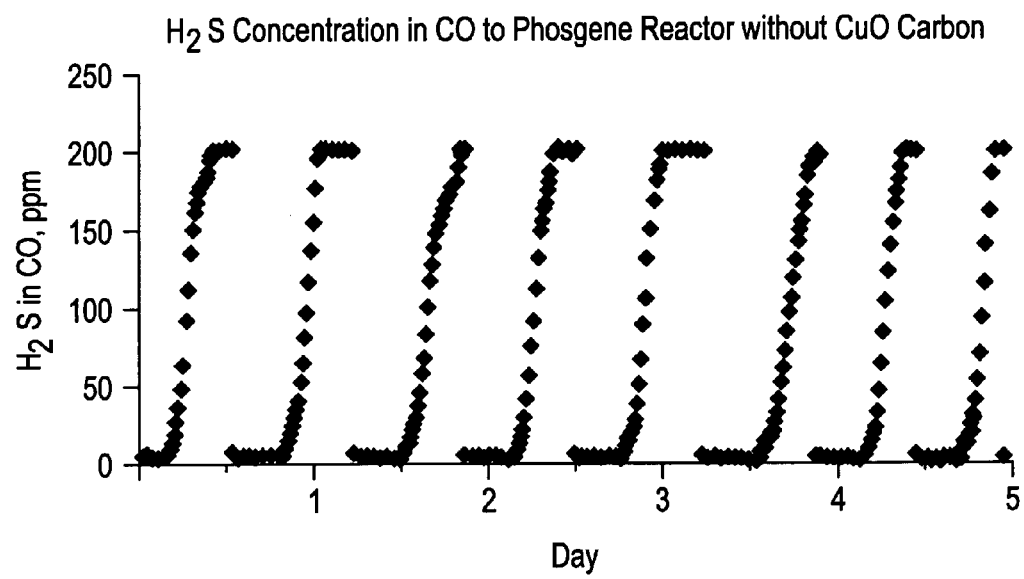
FIG. 2 is a graphical representation of results for a comparison example showing hydrogen sulfide concentration in a carbon monoxide gas stream passed over a non MOI activated carbon only.

FIG. 2 graphically represents the hydrogen sulfide concentration in the modified stream at the mixer (36). The system was monitored for a period of about 5.5 days. As can be seen from the graph, hydrogen sulfide broke through daily (about 200 ppm), during approximately 7 hours out of 14 hours of on-line use of the unit. The COS and $CS_2$ did not break through during the 14 hour on-line time. Primarily as a result of this breakthrough, sulfur deposited on the equipment and on the phosgene reactor. The sulfur deposits totaled about 15 to 20 pounds per day, necessitating frequent shut-downs of phosgene production in order to replace or regenerate the sulfur removal unit, and to clean the equipment that became loaded with sulfur.

Example 2

Removal of Sulfur Compounds Using BPL® Activated Carbon Followed by a CuO-impregnated Activated Carbon The process in Example 1 was repeated with the difference being the use of a polishing bed; namely a CuO-impregnated activated carbon sulfur removal unit (54) disposed downstream of the sulfur removal unit (22). This sulfur removal unit (54) comprised 15,000 lbs CuO impregnated activated carbon (i.e., NUSORB FC).

A carbon monoxide gas stream comprising 4,630 ppm COS, 1,991 ppm $CS_2$, and 118 ppm $H_2S$, passed through the first sulfur removal unit (22) comprising BPL® activated carbon; passing through both the lead position sub-unit (24) and then through the lag position sub-unit (26) at a rate of at 8,000 pounds per hour (lbs/hr). Both lead and lag sub-units included 30,000 lbs of non-MOI activated carbon composition as the sulfur removal composition, which removed COS and $CS_2$ gases to produce a modified stream.

After flowing through the lead and lag positions, the modified stream was passed through the CuO-impregnated activated carbon sulfur removal unit (54), which reduced the hydrogen sulfide concentration to less than 2 ppm. From the sulfur removal unit (54), the $H_2S$ free stream passed through the moisture removal unit (34) that reduced the water content of the stream to 1 ppm before mixing with chlorine in the mixer (36) and being introduced to the reactor (38) where phosgene was produced.

Figure 3:
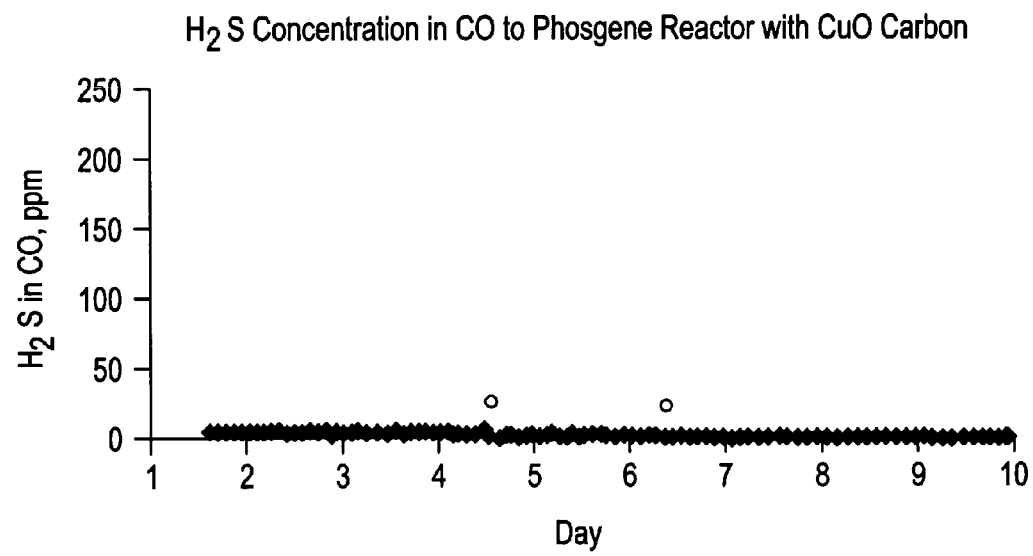
FIG. 3 is a graphical representation of hydrogen sulfide concentration in a carbon monoxide gas stream passed over non-impregnated activated carbon, and subsequently over copper oxide-impregnated activated carbon as depicted in FIG. 1.

FIG. 3 is a graphical representation of the results of hydrogen sulfide removal from carbon monoxide gas using a system as in FIG. 1 and as described in Example 2. It can be seen from the graphical representation of hydrogen sulfide gas concentration over about 9 days of on-line use (i.e., 14 hours per day with regeneration after 14 hours) that, throughout this period, the concentration of hydrogen sulfide at the mixer was less than 10 ppm, and typically less than 2 ppm.

Employing the disclosed process for removing hydrogen sulfide gas from a gas stream containing sulfur compounds, provides a number of advantages over systems that do not employ the MOI activated carbon (especially the CuO impregnated activated carbon) downstream of a non-MOI activated carbon adsorber. One advantage includes producing a carbon monoxide gas stream that is essentially free of hydrogen sulfide, and that can be used for the production of other chemicals, such as phosgene gas, without clogging the pipe lines, filters, mixers, reactors, and catalysts. This system enables the removal of hydrogen sulfide down to a concentration of less than or equal to about 50 ppm, with less than or equal to about 20 ppm preferred, less than or equal to about 2 ppm more preferred, and less than or equal to about 1 ppm readily attainable.

Due to the low hydrogen sulfide concentration of the stream, is a significant increase in on-line use of a catalyst (e.g., a phosgene reactor and catalyst) without shutting down the system for catalyst regeneration or replacement. Prior to the use of the present system, about 15 lbs/(14 hour period)

of sulfur were deposited on equipment and the phosgene catalyst at a CO rate of about 8,000 lbs/hr. In contrast, less than or equal to about 1 lbs/(14 hour period) of sulfur are deposited on equipment and the phosgene catalyst at a CO rate of about 8,000 lbs/hr. As a result of the purity of the CO stream (i.e., the very low $H_2S$ concentration), higher purity polycarbonate can be produced from the resulting phosgene.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process for producing phosgene, comprising:
   introducing a carbon monoxide stream to a metal oxide impregnated activated carbon;
   introducing the carbon monoxide stream to activated carbon that has not been impregnated with a metal oxide prior to introducing the carbon monoxide stream to the metal oxide impregnated activated carbon;
   reducing a concentration of at least one of carbonyl sulfide and carbon disulfide in the carbon monoxide stream;
   reducing a hydrogen sulfide concentration in the carbon monoxide stream to produce a cleaned stream, wherein a cleaned stream hydrogen sulfide concentration is less than or equal to about 20 ppm; and
   reacting carbon monoxide in the cleaned stream with chlorine to produce phosgene.

2. The process of claim 1, further comprising:
   regenerating the metal oxide impregnated activated carbon by:
   ceasing the introduction of the carbon monoxide stream to the metal oxide impregnated activated carbon;
   introducing an inert gas stream comprising oxygen to the metal oxide impregnated activated carbon, wherein at least one of the metal oxide impregnated activated carbon is heated to a temperature of greater than or equal to about 350° C. or the inert gas stream is at a temperature of greater than or equal to about 350° C.; and
   removing sulfur dioxide from the metal oxide impregnated activated carbon.

3. The process of claim 2, wherein the oxygen is present in the inert gas stream in an amount of about 0.2 vol % to about 2 vol %, based upon a total volume of the inert gas stream.

4. A process for producing phosgene, comprising:
   introducing a carbon monoxide stream to a metal oxide impregnated activated carbon, wherein the metal oxide is selected from the group consisting of copper oxide, lanthanum oxide, zinc titanate, iron oxides, calcium oxide, silica, aluminum oxide, and combinations comprising at least one of the foregoing metal oxides;
   reducing a hydrogen sulfide concentration in the carbon monoxide stream to produce a cleaned stream, wherein a cleaned stream hydrogen sulfide concentration is less than or equal to about 20 ppm; and
   reacting carbon monoxide in the cleaned stream with chlorine to produce phosgene.

5. The process of claim 4, wherein the metal oxide comprises copper oxide.

6. The process of claim 4, wherein the hydrogen sulfide concentration is less than or equal to about 10 ppm.

7. The process of claim 6, wherein the hydrogen sulfide concentration is less than or equal to about 2 ppm.

8. The process of claim 7, wherein the carbon monoxide stream introduced to the metal oxide impregnated activated carbon has a hydrogen sulfide concentration of greater than or equal to about 100 ppm.

9. The process of claim 4, further comprising removing water from the cleaned stream to form a dried stream, prior to reacting the carbon monoxide with the chlorine.

10. The process of claim 9, further comprising mixing the dried stream with the chlorine prior to introducing the dried stream to a reactor.

11. The process of claim 4, further comprising adjusting a moisture content of the carbon monoxide stream prior to introducing it to the metal oxide impregnated activated carbon.

12. A process for producing phosgene, comprising:
    introducing a carbon monoxide stream to a metal oxide impregnated activated carbon;
    reducing a hydrogen sulfide concentration in the carbon monoxide stream to produce a cleaned stream, wherein a cleaned stream hydrogen sulfide concentration is less than or equal to about 20 ppm;
    introducing the cleaned stream to an activated carbon that has not been impregnated with a metal oxide, prior to reacting the carbon monoxide with the chlorine, and;
    reacting carbon monoxide in the cleaned stream with chlorine to produce phosgene.

13. The process of claim 12, wherein the hydrogen sulfide concentration is less than or equal to about 10 ppm.

14. The process of claim 12, wherein the carbon monoxide stream introduced to the metal oxide impregnated activated carbon has a hydrogen sulfide concentration of greater than or equal to about 100 ppm.

15. The process of claim 12, further comprising
    removing water from the cleaned stream to form a dried stream, prior to reacting the carbon monoxide with the chlorine; and
    mixing the dried stream with the chlorine prior to introducing the dried stream to a reactor.

16. A process for producing phosgene, comprising:
    adjusting a moisture content of the carbon monoxide stream to form an adjusted stream;
    introducing the adjusted stream to a metal oxide impregnated activated carbon, wherein the metal oxide is selected from the group consisting of copper oxide, lanthanum oxide, zinc titanate, iron oxides, calcium oxide, silica, aluminum oxide, and combinations comprising at least one of the foregoing metal oxides;
    reducing a hydrogen sulfide concentration in the carbon monoxide stream to produce a cleaned stream, wherein a cleaned stream hydrogen sulfide concentration is less than or equal to about 20 ppm;
    removing water from the cleaned stream to form a dried stream; and reacting carbon monoxide in the dried stream with chlorine to produce phosgene.

17. The process of claim 16, further comprising mixing the dried stream with the chlorine prior to introducing the dried stream to a reactor.

18. The process of claim 16, wherein the metal oxide comprises copper oxide.

* * * * *